United States Patent [19]

Tabana et al.

[11] 4,017,436

[45] Apr. 12, 1977

[54] THERMOPLASTIC RESIN COMPOSITION

[75] Inventors: Minoru Tabana, Suita; Tatsuyuki Mitsuno, Toyonaka; Hiroshi Maki, Takatsuki, all of Japan

[73] Assignee: Sumitomo Chemical Company, Limited, Osaka, Japan

[22] Filed: Sept. 2, 1975

[21] Appl. No.: 609,894

[30] Foreign Application Priority Data

Sept. 5, 1974 Japan .............................. 49-102804

[52] U.S. Cl. ..................... 260/27 BB; 260/30.4 A; 260/31.8 DR; 260/33.6 AQ; 260/680 B; 260/829; 260/836; 260/876 B

[51] Int. Cl.$^2$ ..................... C08K 5/01; C08L 93/04

[58] Field of Search ... 260/27 BB, 30.4 A, 33.6 AQ, 260/94.7 A, 680 B, 880 B, 31.8 DR, 829, 836, 876 B

[56] References Cited

UNITED STATES PATENTS

| | | | |
|---|---|---|---|
| 3,239,478 | 3/1966 | Harlan | 260/27 BB |
| 3,329,734 | 7/1967 | Schleimer et al. | 260/680 B |
| 3,789,090 | 1/1974 | Otsuki | 260/680 B |
| 3,852,373 | 12/1974 | Hesse et al. | 260/680 B |

FOREIGN PATENTS OR APPLICATIONS 1,541,288  10/1968  France
1,574,484  7/1969  France

OTHER PUBLICATIONS

Morton–Rubber Technology (2nd ed.) (Van Nostrand) (N.Y.) (1973), pp. 516–518.

*Primary Examiner*—Donald E. Czaja
*Assistant Examiner*—H. H. Fletcher
*Attorney, Agent, or Firm*—Stevens, Davis, Miller & Mosher

[57] ABSTRACT

A resin composition consisting essentially of a styrene-butadiene block copolymer resin, a liquid polybutadiene resin or its modification product, and a tackifier. This resin composition is transparent, excellent in mechanical properties, particularly elongation, impact strength and elastic recovery, and is also improved in film-forming ability and tackiness.

8 Claims, No Drawings

THERMOPLASTIC RESIN COMPOSITION

This invention relates to a novel thermoplastic resin composition. More particularly, the invention is concerned with a resin composition consisting essentially of a styrene-butadiene block copolymer resin, a liquid polybutadiene resin or its modification product, and a tackifier, which composition is transparent, excellent in mechanical properties, particularly elongation, impact strength and elastic recovery, and improved in film-forming ability and tackiness.

The film-forming ability referred to herein means the processability of the composition into a thin film having a thickness of 15 to 25 μ.

Even when used singly, a styrene-butadiene block copolymer resin can give films varying from soft grade to hard grade if the ratio of styrene to butadiene is varied, and thus is preferable as a resin having broad efficiencies for production of food containers, blister packing materials, and shrink films for packing vegetables, fruits and meat.

Because of their characteristic features, vinyl chloride resins have chiefly been used hitherto as stretch films in particular. However, these resins have such drawbacks as to cause environmental pollution at the time of combustion, and hence are presently required to be replaced by other materials. Under such circumstances, the application of styrene-butadiene block copolymer resins to this field is considered to be appropriate.

However, at the time of packing, the stretch film is used in such a manner that it is stretched to wrap an article and the turned-up end of the film is slightly pressed with the hand or the like. Further, when a consumer selects commodities at a store, he frequently presses the film strongly with his finger or the like. Accordingly, it is essential for a resin used as the stretch film to satisfy such conditions as being excellent in film-forming ability, transparency and elastic recovery and proper in tackiness, in addition to the properties required for general film grade resins. Even when varied merely in block structure or butadiene content, styrene-butadiene block copolymer resins cannot satisfy all the above-mentioned conditions. That is, the melt-stretchability of styrene-butadiene block copolymer resins is greatly affected by their molecular weights, and those which are relatively low in molecular weight are more favorable in film-forming ability, while those which are high in molecular weight give films that are easily torn. Thus, styrene-butadiene copolymer resins processable into stretch films are restricted in molecular weight range. As to the elastic recovery and tackiness of the resulting stretch films also, styrene-butadiene block copolymer resins are considerably inferior to vinyl chloride resins.

With an aim to obtain a stretch film grade resin composition by use of a styrene-butadiene block copolymer resin as a base, the present inventors conducted extensive studies to find that when a styrene-butadiene block copolymer resin is incorporated with a liquid polybutadiene resin or its modification product and a tackifier, it is possible to obtain a resin composition excellent in film-forming ability, elastic recovery and tackiness without degradation in transparency. Based on this finding, the inventors have accomplished the present invention.

An object of the present invention is to provide a novel thermoplastic resin composition.

Other objects and advantages of the invention will become apparent from the following description.

When incorporated with a liquid polybutadiene resin or its modification product, a styrene-butadiene block copolymer resin is greatly improved in film-forming ability and elastic recovery, and when the thus treated copolymer resin is incorporated with a tackifier, a proper tackiness necessary for stretch film grade resin is imparted to the resin. Furthermore, the transparency of the copolymer resin is not greatly degraded when the kinds and amounts of the liquid polybutadiene resin or its modification product and the tackifier are properly selected.

The styrene-butadiene block copolymer used in the present invention is prepared by block copolymerizing styrene with butadiene according to usual anion living polymerization, and has a total styrene content of 65 to 90 weight %, a total butadiene content of 10 to 35 weight %, and an intrinsic viscosity of 0.35 to 1.8 dl/g as measured in toluene solvent at 30° C.

A particularly preferable styrene-butadiene block copolymer resin for use in the present invention is one represented by general formula, $$A_1 - B_1 - C - B_2 - A_2$$

wherein $A_1$ and $A_2$ are non-elastomeric blocks comprising a styrene polymer chain; $B_1$ and $B_2$ are elastomeric blocks comprising a random copolymer chain in which styrene and butadiene have uniformly been distributed; C is an elastomeric block comprising a butadiene homopolymer chain or a styrene-butadiene copolymer chain; the proportion of the sum of $A_1$ and $A_2$ in the block copolymer is 40 to 80 weight %; the proportion of the sum of $B_1$ and $B_2$ in the block copolymer is 10 to 60 weight %; the proportion of C in the block copolymer is 0 to 25 weight % and is always smaller than the proportion of the sum of $B_1$ and $B_2$; the weight ratio of $A_1$ and $A_2$ is in the range from 2:8 to 8:2; the weight ratio of $B_1$ to $B_2$ is in the range from 0:10 to 10:0; the weight ratio of styrene and butadiene in $B_1$ and $B_2$ is in the range from 10:90 to 75:25; and the weight ratio of styrene to butadiene in C is in the range from 0:100 to 10:90.

The styrene-butadiene block copolymer resin can be prepared, for example, in such a manner that each of styrene and butadiene, or a mixture of the two in a fixed ratio, is added in a predetermined order to a polymerization system and block copolymerized in a hydrocarbon solvent in the presence or absence of an ether compound or a tertiary amine using an organolithium compound as an initiator. Further, the random copolymer chain, wherein styrene and butadiene have uniformly been distributed, which is represented by each of $B_1$ and $B_2$ in the aforesaid general formula, can be obtained by intermittently or continuously adding to a polymerization system a mixture of styrene and butadiene in a fixed ratio.

The liquid polybutadiene resin used in the present invention includes low molecular weight butadiene homopolymers and low molecular weight butadiene-styrene copolymers, and its modification product includes maleic anhydride-modified products and epoxidation-modified products.

Among the low molecular weight butadiene homopolymers, a polymer containing a major amount of 1,4-cis configuration is obtained in the presence of a Ziegler catalyst such as a catalyst system comprising an organoaluminum compound and a nickel compound, and a polymer containing a major amount of 1,4-trans configuration is obtained by polymerizing 1,3-butadiene in the presence of a Ziegler type transition metal catalyst or a radical polymerization catalyst. The average molecular weight of each of these polymers is from 300 to 10,000, but is preferably 1,000 to 7,000.

The low molecular weight butadiene-styrene copolymers are obtained by polymerizing 40 weight % or less of styrene with 60 weight % or more of 1,3-butadiene in the presence of a Ziegler type catalyst, and have an average molecular weight of 300 to 5,000.

The maleic anhydride-modified products of the low molecular weight butadiene homopolymers are desirably those which are obtained by modifying a low molecular weight butadiene homopolymer having an average molecular weight of 250 to 5,000 with 20 weight % or less of maleic anhydride.

Further, the epoxidation-modified products of the low molecular weight butadiene homopolymers are desirably those which are obtained by epoxidizing a low molecular weight butadiene homopolymer having an average molecular weight of 250 to 5,000 with an organic peracid such as performic or peracetic acid, and have an oxirane-oxygen content of 0.5 to 20 weight %.

The tackifier used in the present invention includes natural resins such as resin and terpene type resins, and synthetic resins such as petroleum type hydrocarbon resins and cumarone-indene resins, and may be any of commercially available tackifiers.

The content of the styrene-butadiene block copolymer resin in the resin composition is in the range from 70 to 94 weight %. The contents of the liquid polybutadiene resin and the tackifier in the resin composition are individually in the range from 3 to 15 weight %. However, the most effective contents of the liquid polybutadiene resin and the tackifier to improve the styrene-butadiene block copolymer in film-forming ability, elastic recovery and tackiness without deterioration in transparency vary depending on the structures thereof.

The blending of the styrene-butadiene block copolymer with the liquid polybutadiene resin and the tackifier may be carried out according to conventional procedure using a roll mill, a Banbury mixer or an extruder. The thus obtained thermoplastic resin composition of the present invention is transparent, excellent in film-forming ability and elastic recovery and proper in tackiness, and hence is preferable as a material for stretch film in particular.

The resin composition of the present invention may be incorporated with 5 to 20 weight % of at least one of phthalic acid esters and aliphatic dibasic acid esters which are generally used as plasticizers.

The present invention is illustrated in more detail below with reference to Referential Example and Example, but the invention is not limited to these.

REFERENTIAL EXAMPLE

The styrene-butadiene block copolymer resin for use in the present invention was prepared in the manner mentioned below.

Preparation of styrene-butadiene block copolymer resin:

Into a 25-liter, stainless steel-made autoclave equipped with a stirrer and a jacket, which had been flushed with nitrogen, were charged 15 liters of dry cyclohexane as a solvent, 1.50 kg. of styrene, 9.0 g. of tetrahydrofuran and 75 mmol. in the form of solution of n-butyllithium as an initiator, and polymerization was initiated. After conducting the polymerization at 60° C. for 1.5 hours, a mixture comprising 375 g. of styrene and 375 g. of butadiene was gradually added as a second stage monomer over a period of 1 hour at a uniform speed, and, after completion of the addition, the mixture was stirred for 30 minutes. Subsequently, 500 g. of butadiene was added as a third stage monomer, and the polymerization was continued for 1 hour. Thereafter, a mixture comprising 375 g. of styrene and 375 g. of butadiene was gradually added as a fourth stage monomer over a period of 1 hour at a uniform rate, and, after completion of the addition, the mixture was stirred for 30 minutes. Finally, 1.50 kg. of styrene was added as a fifth stage monomer, and the polymerization was continued at 50° C. for 1.5 hours. Thereafter, 50 ml. of methanol as polymerization terminator and 50 g. of 2,6-di-tert-butylphenol as an anti-oxidant were added to terminate the polymerization. The resulting viscous polymerization liquid was mixed with a large amount of methanol with vigorous stirring to precipitate a polymer, which was then recovered by filtration and dried under reduced pressure. The yield of the polymer was substantially 100%. As the result of analysis, it was found that the polymer had an intrinsic viscosity of 0.74 dl/g as measured in toluene at 30° C., a butadiene content of 25 weight %, and a melt index (according to JIS K 6760) of 0.30 g/10 min. as measured under the conditions of a temperature of 190° C. and a load of 2.16 kg.

EXAMPLE

Prescribed amounts of the styrene-butadiene block copolymer resin obtained in the above-mentioned Referential Example, liquid polybutadiene resins of a liquid 1,4-cis polybutadiene having an average molecular weight of 1,500 and a liquid 1,2-vinyl polybutadiene having an average molecular weight of 1,000, and tackifiers of Ester Gum H (a partially hydrogenated rosin produced by Arakawa Rinsan Kagaku Co.) and Arkon P-115 (a hydrogenated petroleum type hydrocarbon resin produced by Arakawa Rinsan Kagaku Co.) were kneaded for 10 to 15 minutes by use of an 8-inch mixing roll at a roll surface temperature of 150° C. The resulting composition was press-molded to prepare a tensile test piece, which was subjected to physical property test. Further, the composition was tested in ability of forming a film having a thickness of 15 to 25 $\mu$ by use of a 30 mm $\phi$ extruder to evaluate the composition in film-forming ability, and the resulting film was measured in tackiness. As a control sample, there was used Hi-wrap (a vinyl chloride resin-made stretch film having a thickness of 18 $\mu$; produced by Mitsui Toatsu kagaku Co.). The results obtained were as summarized in Table 1.

Each evaluation item shown in Table 1 was measured in the following manner:
  Film-forming ability: Represented by the easiness of the composition in forming into a film having a thickness of 15 to 25 $\mu$ by use of a 30 mm. $\phi$ extruder.
  Total light transmittance: The composition was press-molded into a sheet of 3 mm. in thickness which was then tested according to ASTM D-1003-52.

Elastic recovery: Represented by the ratio of recovery of deformation at the time when each sample was elongated by use of a JIS No. 3 dumbbell under condition of a tensile rate of 5 mm/min. and the stress was released when a 100% elongation was reached.

Tackiness: Two films, each having a thickness of 15 to 25 μ were superposed each other, and a load of 1.75 kg. was applied to the superposed films. After incubating at 20° C. for 1 day, the films were peeled off from each other and evaluated, in comparison with a vinyl chloride resin-made stretch film, as to whether or not a proper tackiness necessary for stretch films had been imparted thereto. Among the marked representing the tackiness, ⊚ is the most superior, and ○, Δ and X are inferior in this order.

Table 1

| No. | Styrene-butadiene block copolymer (wt. %) | Liquid polybutadiene resin Name | Amount (wt. %) | Tackifier Name | Amount (wt. %) | Film-forming ability | Total light transmittance (%) | Elastic recovery (%) | Tackiness |
|---|---|---|---|---|---|---|---|---|---|
| 1 | 100 | — | — | — | — | Somewhat inferior | 88 | 60 | X |
| 2 | 90 | 1,4-Cis polybutadiene | 10 | — | — | Superior | 86 | 75 | X |
| 3 | 90 | — | — | Ester Gum H | 10 | Somewhat inferior | 85 | 62 | ○ |
| 4 | 94 | 1,4-Cis polybutadiene | 3 | " | 3 | Considerably superior | 86 | 68 | Δ |
| 5 | 90 | " | 5 | " | 5 | Superior | 83 | 70 | ○ |
| 6 | 80 | " | 10 | " | 10 | " | 81 | 75 | ⊚ |
| 7 | 70 | " | 15 | " | 15 | " | 76 | 80 | ⊚ |
| 8 | 94 | 1,4-Cis polybutadiene | 3 | Arkon P-115 | 3 | Considerably superior | 86 | 72 | ○ |
| 9 | 90 | 1,4-Cis polybutadiene | 5 | Arkon P-115 | 5 | Superior | 85 | 78 | ○ |
| 10 | 80 | " | 10 | " | 10 | " | 83 | 80 | ⊚ |
| 11 | 70 | " | 15 | " | 15 | " | 80 | 83 | ⊚ |
| 12 | 90 | 1,2-Vinyl polybutadiene | 10 | — | — | " | 86 | 75 | X |
| 13 | 80 | " | 10 | Ester Gum H | 10 | " | 83 | 78 | ⊚ |
| 14 | 80 | " | 10 | Arkon P-115 | 10 | " | 86 | 78 | ⊚ |
| 15 | Hi-wrap (M Type) | | | | | — | 84 | 80 | ⊚ |

As is clear from Table 1, a styrene-butadiene block copolymer resin is greatly improved in film-forming ability and elastic recovery when incorporated with a liquid polybutadiene resin, and comes to have a proper tackiness necessary for formation of stretch film when incorporated with a tackifier, without causing any great deterioration in transparency. In Table 1, each of Nos. 4, 5, 6, 7, 8, 9, 10, 11, 13 and 14 shows a system incorporated with both a liquid polybutadiene resin and a tackifier, and is a composition preferable as a stretch film grade resin which has been improved in every one of film-forming ability, transparency, elastic recovery and tackiness.

What is claimed is:

1. A resin composition consisting essentially of
   a. a styrene-butadiene block copolymer resin represented by the formula, $$A_1 - B_1 - C - B_2 - A_2$$

wherein $A_1$ and $A_2$ are non-elastomeric blocks comprising a styrene polymer chain; $B_1$ and $B_2$ are elastomeric blocks comprising a random copolymer chain in which styrene and butadiene have uniformly been distributed; C is an elastomeric block comprising a butadiene homopolymer chain or a styrene-butadiene copolymer chain; the proportion of the sum of $A_1$ and $A_2$ in the block copolymer is 40 to 80 weight %; the proportion of the sum of $B_1$ and $B_2$ in the block copolymer is 10 to 60 weight %; the proportion of C in the block copolymer is 0 to 25 weight % and is always smaller than the proportion of the sum of $B_1$ and $B_2$; the weight ratio of $A_1$ to $A_2$ is in the range from 2:8 to 8:2; the weight ratio of $B_1$ to $B_2$ is in the range from 0:10 to 10:0; the weight ratio of styrene to butadiene in $B_1$ and $B_2$ is in the range from 10:90 to 75:25; and the weight ratio of styrene to butadiene in C is in the range from 0:100 to 10:90,
   b. a resin selected from the group consisting of a liquid polybutadiene, a liquid butadiene-styrene copolymer, a maleic anhydride-modified liquid polybutadiene and an epoxidation-modified liquid polybutadiene, and
   c. a tackifier, wherein the contents of (a) the styrene-butadiene block copolymer, (b) the resin, and (c) the tackifier are 70 to 94 weight %, 3 to 15 weight % and 3 to 15 weight %, respectively.

2. A composition according to claim 1, wherein the styrene-butadiene block coplymer resin has a total styrene content of 65 to 90 weight %, a total butadiene content of 10 to 35 weight %, and an intrinsic viscosity of 0.35 to 1.8 dl/g as measured in toluene solvent at 30° C.

3. A composition according to claim 1, wherein said resin is a liquid butadiene homopolymer or a liquid butadiene-styrene copolymer having an average molecular weight of 300 to 10,000.

4. A composition according to claim 1, wherein the maleic anhydride-modified product is a product which is obtained by modifying a butadiene homopolymer having an average molecular weight of 250 to 5,000 with 20 weight % or less of maleic anhydride.

5. A composition according to claim 1, wherein the epoxidation-modified product is a product which is obtained by epoxidizing a butadiene homopolymer having an average molecular weight of 250 to 5,000 with an organic peracid and has an oxirane-oxygen content of 0.5 to 20 weight %.

6. A composition according to claim 5, wherein the organic peracid is performic or peracetic acid.

7. A composition according to claim 1, wherein the tackifier is a rosin type resin, a terpene type resin, a petroleum type hydrocarbon resin or a cumarone-indene resin.

8. A composition according to claim 1 which has been incorporated with, as a plasticizer, at least one member selected from the group consisting of phthalic acid esters and aliphatic dibasic acid esters.

* * * * *